(12) United States Patent
Liu (10) Patent No.: US 8,014,673 B2
(45) Date of Patent: Sep. 6, 2011

(54) MANAGEMENT METHOD OF OPTICAL FIBER NETWORK SYSTEM

(75) Inventor: Chuan-Wei Liu, Hsinchu County (TW)

(73) Assignee: Accton Technology Corporation, Hsinchu (TW)

( * ) Notice: Subject to any disclaimer, the term of this patent is extended or adjusted under 35 U.S.C. 154(b) by 638 days.

(21) Appl. No.: 11/907,913

(22) Filed: Oct. 18, 2007

(65) Prior Publication Data

US 2008/0253769 A1 Oct. 16, 2008

(30) Foreign Application Priority Data

Apr. 16, 2007 (TW) .............................. 96113397 A (51) Int. Cl.
*H04B 10/00* (2006.01)

(52) U.S. Cl. ................ 398/71; 398/72; 398/70

(58) Field of Classification Search .............. 398/58–64, 398/66–72
See application file for complete search history.

(56) References Cited

U.S. PATENT DOCUMENTS

| | | | |
|---|---|---|---|
| 2007/0058666 A1* | 3/2007 | Pratt | 370/463 |
| 2007/0140132 A1* | 6/2007 | Banerjee et al. | 370/241.1 |
| 2008/0253291 A1* | 10/2008 | Liu | 370/238 |

* cited by examiner

*Primary Examiner* — Agustin Bello
(74) *Attorney, Agent, or Firm* — Birch, Stewart, Kolasch & Birch, LLP (57) ABSTRACT

A management method of an optical fiber network system is disclosed. The optical fiber network system includes at least one user apparatus and an optical network unit (ONU), and the ONU is connected with the user apparatus. The management method includes the steps of: adopting at least one information string, which is set by an ONU management and control interface (OMCI), by the optical network unit; packing the information string into a management packet; and transmitting the management packet to the user apparatus by the optical network unit according to an Ethernet protocol.

9 Claims, 7 Drawing Sheets

| target address | source address | length/type | sub-type | label | code | data | FCS |
|---|---|---|---|---|---|---|---|
| 6 | 6 | 2 | 1 | 2 | 1 | 42-1496 | 4 | byte

MANAGEMENT METHOD OF OPTICAL FIBER NETWORK SYSTEM

CROSS REFERENCE TO RELATED APPLICATIONS

This Non-provisional application claims priority under 35 U.S.C. §119(a) on Patent Application No(s). 096113397 filed in Taiwan, Republic of China on Apr. 16, 2007, the entire contents of which are hereby incorporated by reference.

BACKGROUND OF THE INVENTION

1. Field of Invention

The invention relates to a management method of a network system, and, in particular, to a management method of an optical fiber network system.

2. Related Art

With the rapid development of information technology and the quick allocation of the fundamental construction of networks, network broadband applications, such as online games, online learning and video conferences, are getting more and more popularized. The optical fiber performs the characteristics of the high bandwidth, large capacity, low loss and robustness that cannot be influenced by the electromagnetic wave. Compared with the other propagation media, the optical fiber provides the distinct advantages. Under the situation of the rapid growth of the optical communication technology, the optical fiber gradually replaces the conventional copper transmission wire, which is originally used in the conventional manner of the communication, and becomes the trend of the broadband network construction in the future. In the early stage, the telecommunication companies have built the optical fiber as the backbone network from the beginning, and now the construction of the global backbone network/metro area network is almost in saturation. The optical fiber has been gradually developed toward the direction of being the access network, and various broadband access network technologies, mostly employing the optical fiber, are successfully developed.

Figure 1:
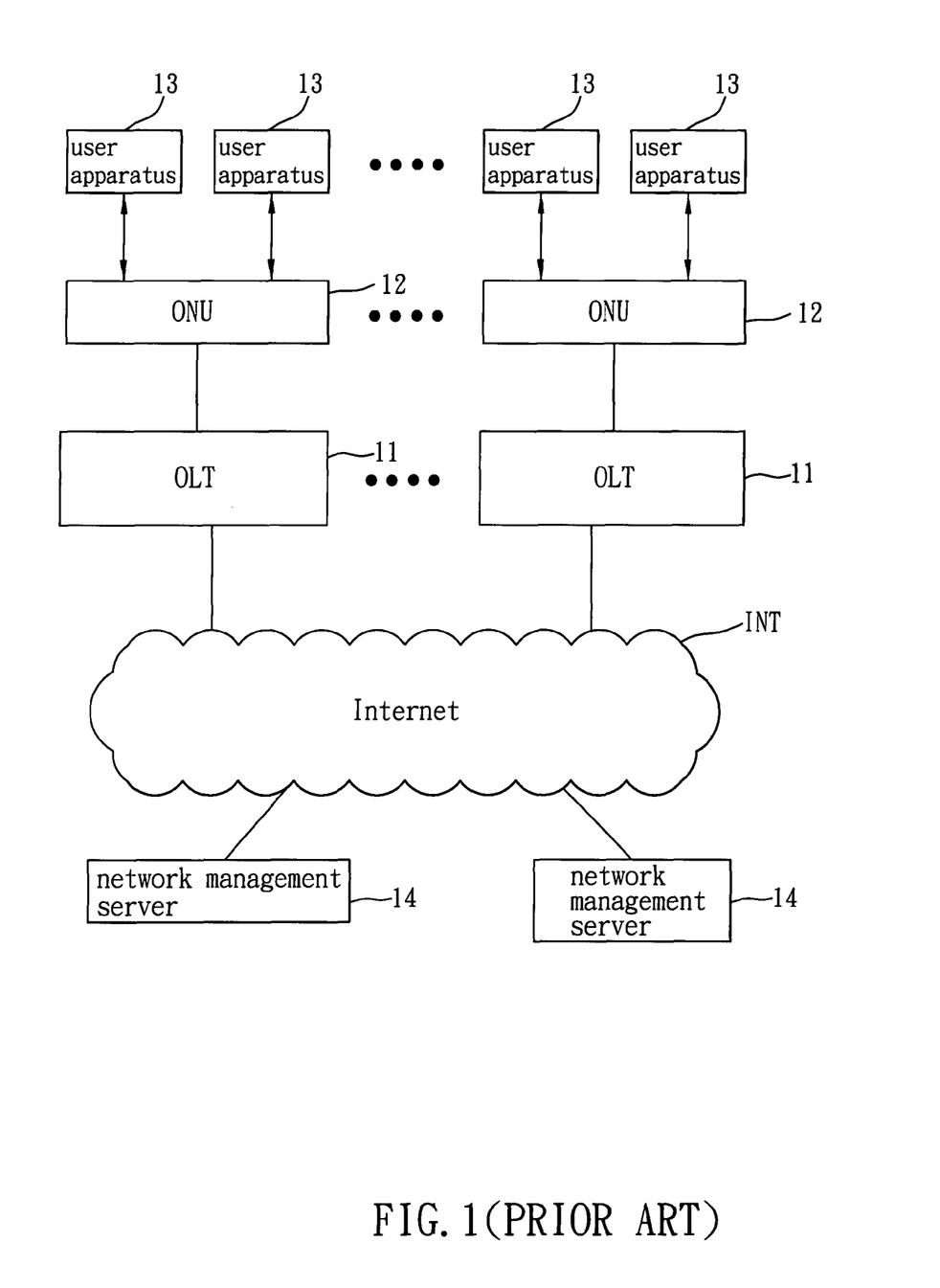
FIG. 1 is a schematic illustration showing a conventional optical fiber network system.

In general, referring to FIG. 1, a network system 1 comprising an optical fiber access network includes a plurality of optical line terminals (OLTs) 11 and an optical network unit (ONU) 12. The OLT 11 serves as a central serving apparatus, which is connected with an Internet INT and the ONU 12. The ONU 12 serves as a terminal apparatus of a user, which is connected with a user apparatus 13. In addition, a network management server 14 of an Internet service provider (ISP) for monitoring or managing a network apparatus (e.g., modem) of the user apparatus 13 or updating programs of the network apparatus through the Internet INT is connected with the other end of the Internet INT.

In addition, when the OLT 11 performs the network management, the OLT 11 manages and controls the ONU 12 through an ONU management and control interface (OMCI) established by an ITU (International Telecommunication Union). For example, the OLT 11 creates/releases the connection with the ONU 12, manages the user network interface (UNI) of the ONU 12, requests the configuration message and the performance statistics, and automatically informs the system manager of the event such as connection failure.

To sum up, the OMCI provides the ONU 12 the management functions of configuration management, failure management, performance management and safety management. However, since the OMCI is only adapted to the allocation between the OLT 11 and the ONU 12, the management functions are only effective to the ONU 12. The ONU 12 needs to use the function, which is set according to other network management protocol and may be a simple network management protocol (SNMP), to manage the network apparatus of the user apparatus 13. Thus, the OMCI cannot be used to perform the network management between the ONU 12 and the user apparatus 13, and the overall network management efficiency is lowered.

Therefore, it is an important subject to provide a management method of an optical fiber network system, which can use the network management function set by the OMCI between the optical network unit and the user apparatus and thus enhance the overall network management efficiency.

SUMMARY OF THE INVENTION

In view of the foregoing, the invention is to provide a management method of an optical fiber network system, which can use the network management function set by the OMCI between an optical network unit and a user apparatus and thus enhance the overall network management efficiency.

To achieve the above, the invention discloses a management method of an optical fiber network system. The optical fiber network system includes at least one user apparatus and an optical network unit connected with the user apparatus. The management method includes the following steps of: adopting at least one information string, which is set by an ONU management and control interface (OMCI), by the optical network unit; packing the information string into a management packet; and transmitting the management packet to the user apparatus by the optical network unit according to an Ethernet protocol.

As mentioned above, the Ethernet is established between the optical network unit and the user apparatus, the management functions set by the OMCI are packed into the management packet, and the management packet is transmitted to the user apparatus for the network management according to the Ethernet protocol in the optical fiber network system and its management method according to the invention. Compared with the related art, the invention can continue using the network management functions, which is set by the OMCI, between the optical network unit and the user apparatus, but does not adopts other network management protocols for the network management. Thus, the overall network management efficiency can be enhanced.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 2:
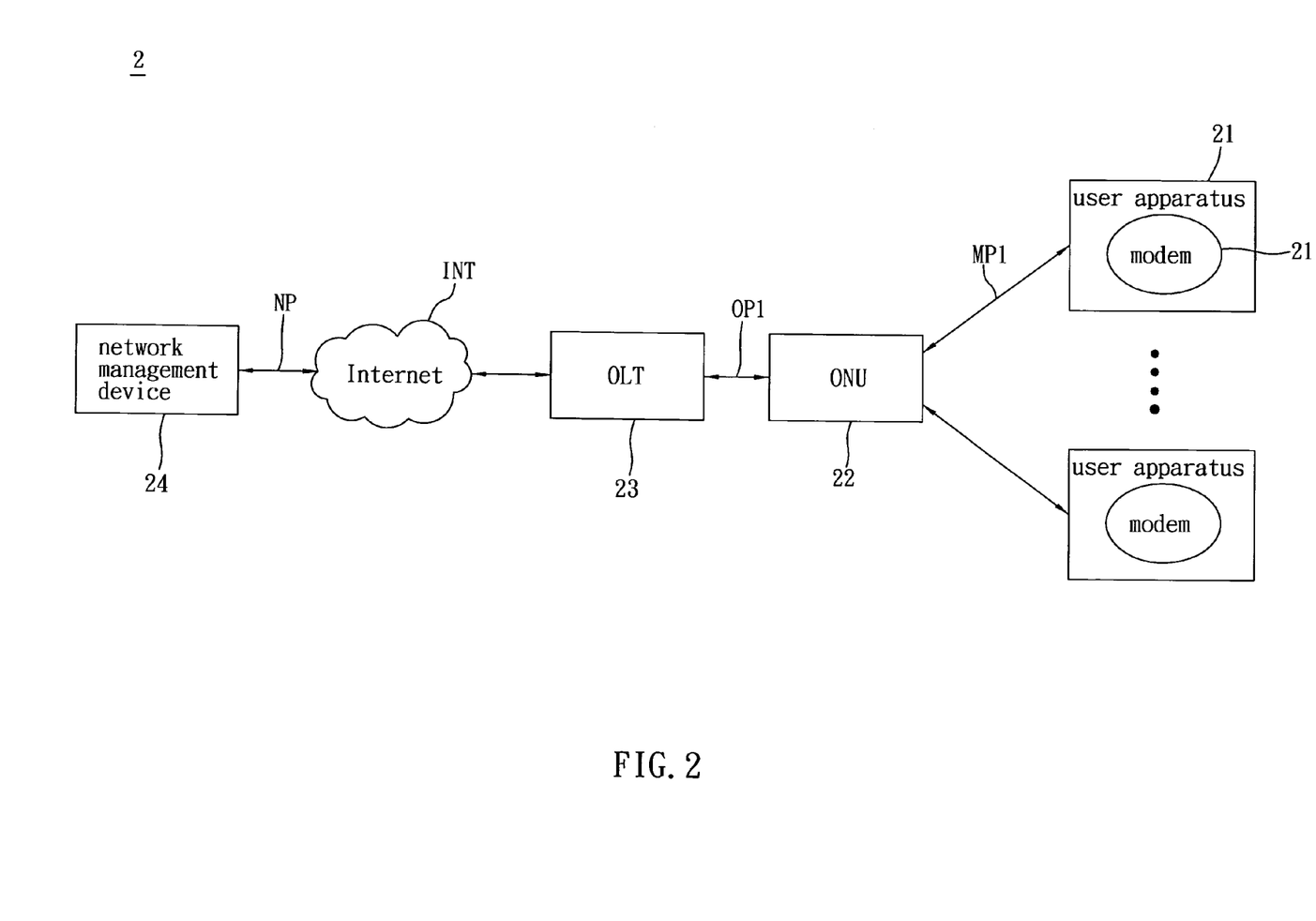
FIG. 2 is a schematic illustration showing an optical fiber network system according to a preferred embodiment of the invention.

Referring to FIG. 2, an optical fiber network system 2 according to a preferred embodiment of the invention includes at least one user apparatus 21, an optical network unit (ONU) 22, an optical line terminal (OLT) 23 and a network management device 24. The OLT 23 serves as a central serving apparatus, which is connected with an Internet INT and the ONU 22. The ONU 22 serves as a terminal apparatus of a user, which is connected with the user apparatus 21. Herein, the ONU 22 is connected with the user apparatus 21 through a modem 211 of the user apparatus. In addition, the network management device 24 for performing the network management, such as monitoring, managing or updating the programs, for the user apparatus 21 through the Internet INT is connected with the other end of the Internet INT.

In this embodiment, the user apparatus 21 may be a personal computer, a personal digital assistant (PDA) or any other terminal apparatus. The modem 211 serves as a data converting medium between the user apparatus 21 and the ONU 22 and converts an optical signal in the optical fiber network into an electrical signal that may be accepted by the user apparatus 21 so that data transmission may be performed therebetween, for example. In addition, the network management device 24 may be a network management server, such as the network management server of an Internet service provider (ISP), for performing the network management for the user apparatus 21 through the Internet INT.

Data is transmitted between the ONU 22 and the user apparatus 21 through the Ethernet. The ONU 22 transmits a management packet MP1 to the user apparatus 21 according to an Ethernet protocol to manage the network of the user apparatus 21. The Ethernet protocol is defined for the first and second layers of an open systems interconnection (OSI) reference model, and also is the protocol for the physical layer and the data-link layer. The management packet MP1 transmits the data through a media access control address.

In this embodiment, the ONU 22 adopts IEEE 802.3ah as the Ethernet protocol, wherein IEEE 802.3ah is recently constituted and popularized by the IEEE 802.3ah working group and the Ethernet in the first mile alliance (EFMA). The Ethernet can be applied to the client according to this protocol so that the bandwidth and the transmission speed of the access network can be increased, and the cost of the network system can be reduced.

Figure 3:
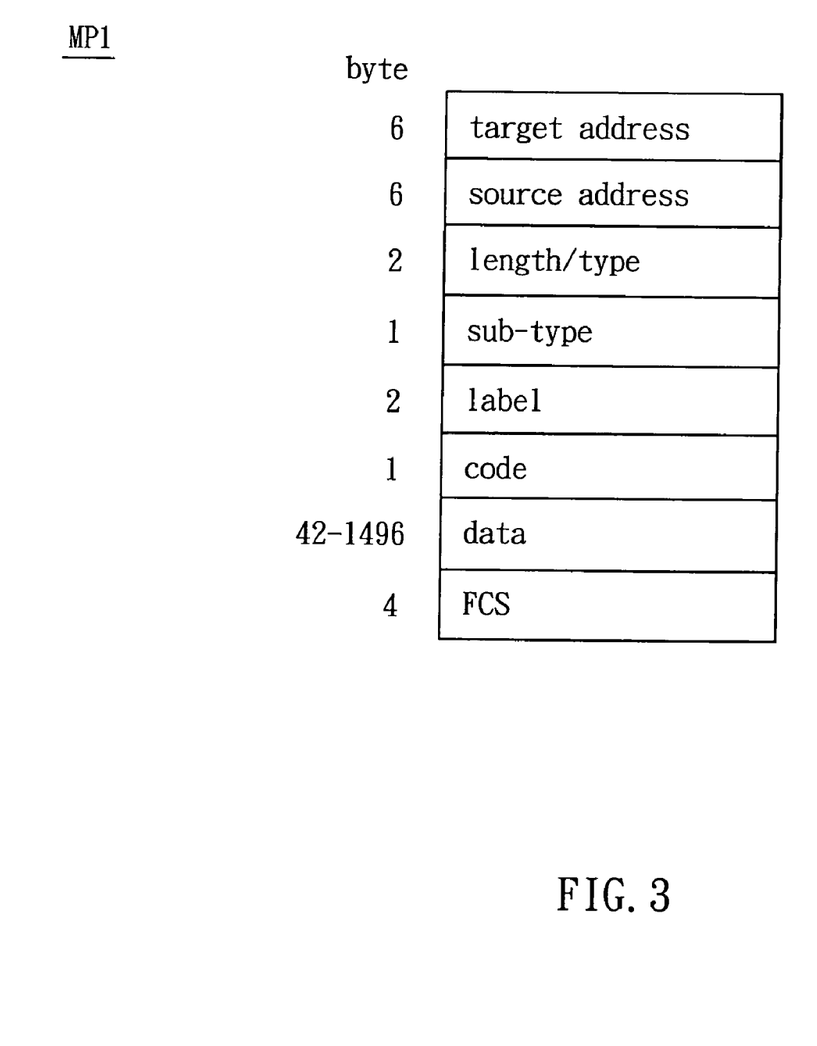
FIG. 3 is a schematic illustration showing an OAMPDU packet used in the optical fiber network system according to the preferred embodiment of the invention.

The IEEE 802.3ah protocol also defines the operation, administration and maintenance (OAM) functions of the Ethernet, and the packet with these functions is defined as an OAMPDU (OAM Protocol Data Unit) packet. The OAMPDU packet, as shown in FIG. 3, has many fields, such as the fields of a target address, a source address and the data. Each field includes specific bytes for storing information, wherein the main content of the packet is stored in the data field. In this embodiment, the management packet MP1 transmitted by the ONU 22 is the OAMPDU packet.

As shown in FIG. 2, when the network management device 24 wants to manage the network of the user apparatus 21, it transmits an Internet protocol (IP) packet NP to the OLT 23 through the Internet INT, and the OLT 23 transmits an OMCI packet OP1 to the ONU 22 through the ONU management and control interface (OMCI). The OMCI packet OP1 includes an information string, which provides the management functions of configuration management, failure management, performance management and safety management set by the OMCI.

Figure 4:
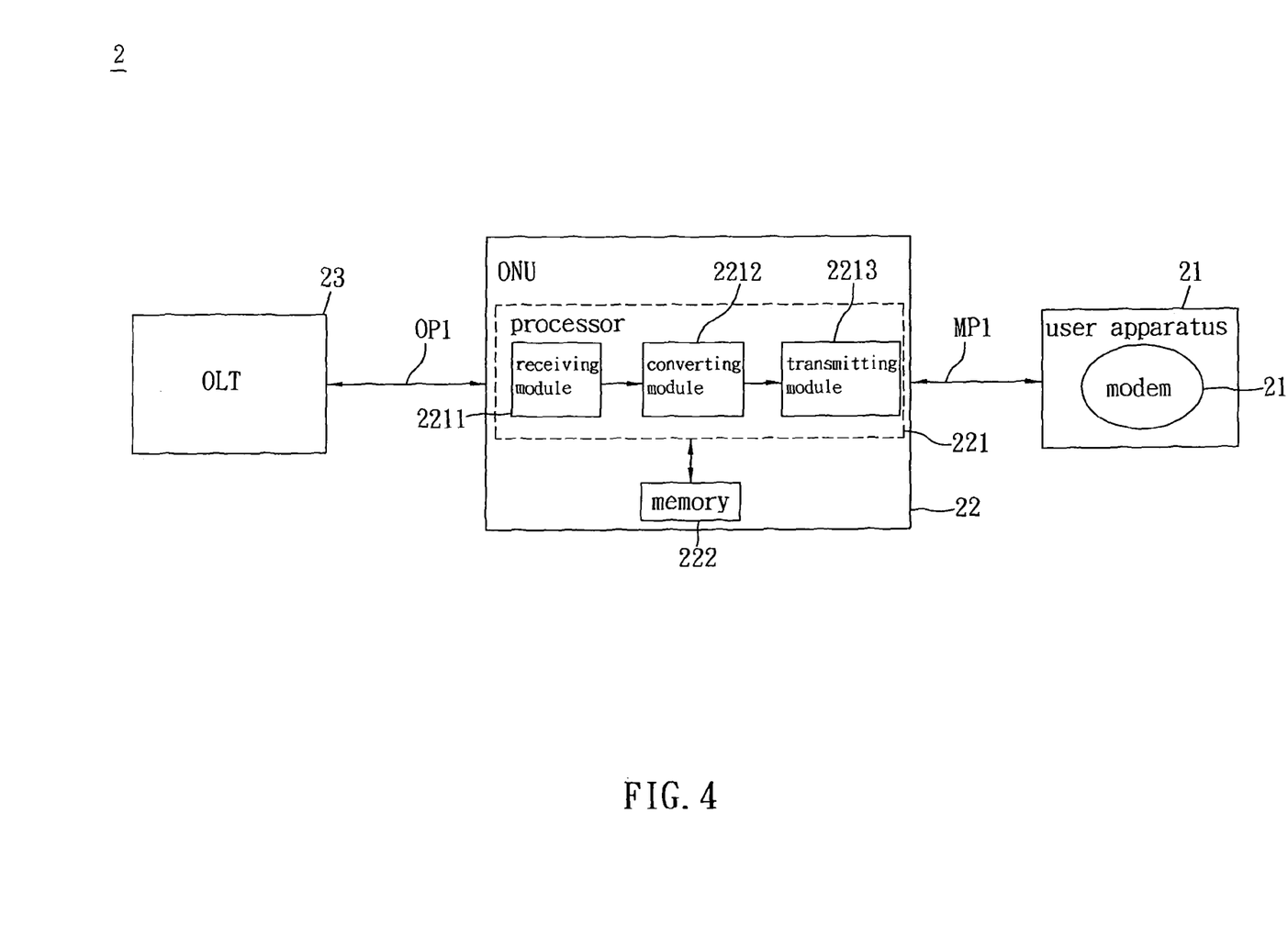
FIG. 4 is a block diagram showing the optical fiber network system and its optical network unit according to the preferred embodiment of the invention.

As shown in FIG. 4, the ONU 22 includes a processor 221. The processor 221 includes a receiving module 2211, a converting module 2212 and a transmitting module 2213. The receiving module 2211 receives the OMCI packet OP1 transmitted from the OLT 23, and transmits the OMCI packet OP1 to the converting module 2212. The converting module 2212 is electrically connected to the receiving module 2211, captures the information string from the OMCI packet OP1, and packs the information string into the management packet MP1 according to the Ethernet protocol. Herein, the information string is packed into the OAMPDU packet according to the IEEE 802.3ah protocol. The ONU 22 can obtain the information string from the OMCI packet OP1 transmitted from the outside, and may also include the built-in information string set by the OMCI.

Figure 5:
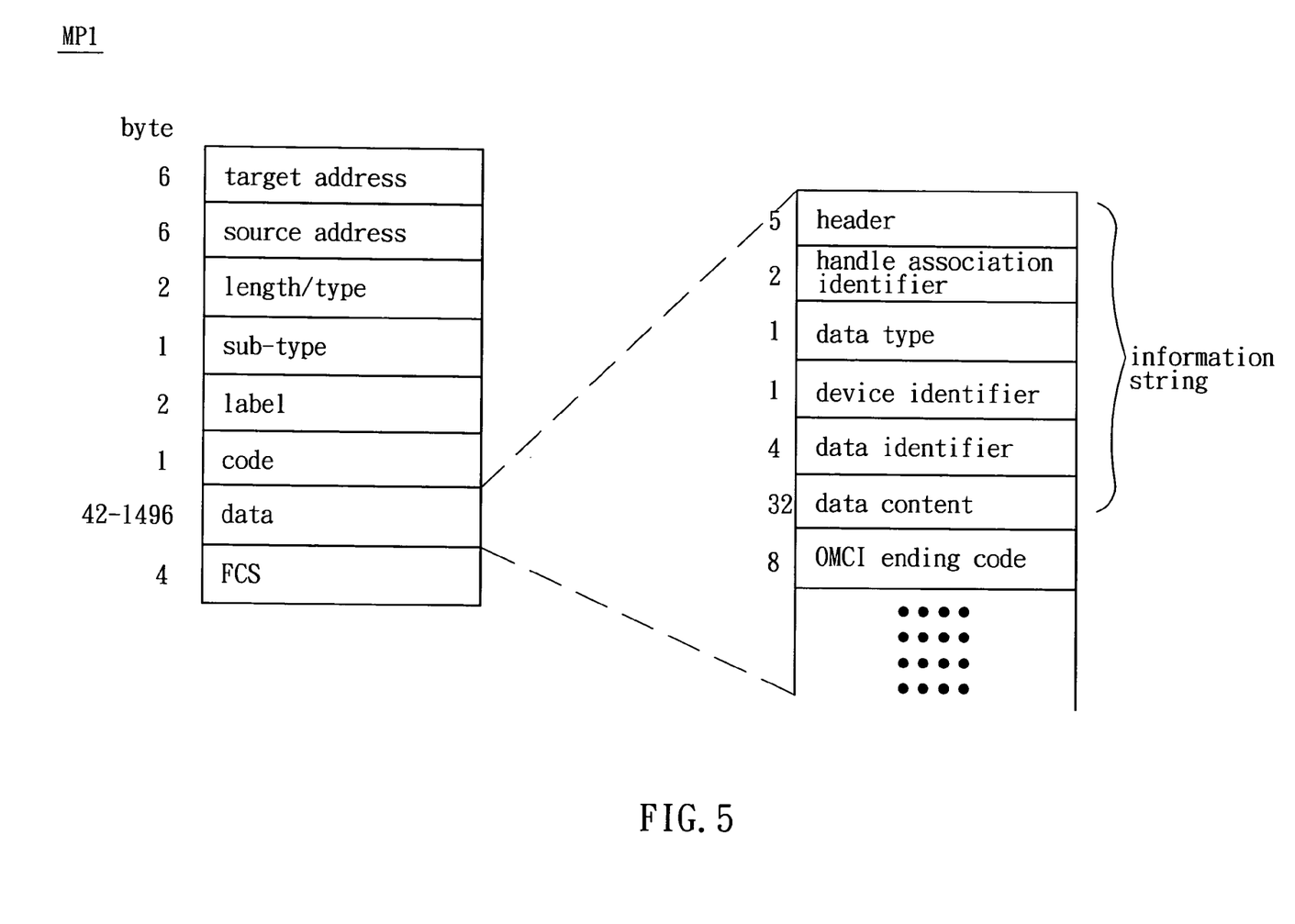
FIG. 5 is a schematic illustration showing an information string of the OAMPDU packet used in the optical fiber network system according to the preferred embodiment of the invention.

As shown in FIG. 5, the information string may be placed in the data field of the management packet MP1, and the information string includes a header, a data type, a data content and other fields, wherein each field includes the specific bytes for storing the information, and the main content is stored in the data content field. In addition, in order to make the device, which receives the management packet MP1, easily recognize the length of the information string, an OMCI ending code is added to the data field so that the ending bit of the information string is identified by the OMCI ending code. Herein, the OMCI ending code is disposed adjacent to the information string. In addition, in order to differentiate the OAMPDU packet used for transmitting the information string set by the OMCI from the other OAMPDU packets, the parameters in the code field of the OAMPDU packet may be set by a developer.

As shown in FIG. 4, after the information string is completely packed, the converting module 2212 transmits the management packet MP1 to the transmitting module 2213 electrically connected to the converting module 2212. The transmitting module 2213 transmits the management packet MP1 to the user apparatus 21. Consequently, the ONU 22 may manage the network of the user apparatus 21 according to the network management function set by the OMCI.

In addition, the ONU 22 can obtain the information of the user apparatus 21 in the discovery procedure defined in the IEEE 802.3ah protocol in this embodiment. The ONU 22 transmits the OAMPDU packet to the user apparatus 21, which transmits an acknowledgement packet to the ONU 22. The acknowledgement packet includes the hardware information of the user apparatus 21. In addition, the hardware information may be stored in a memory 222 of the ONU 22.

Figure 6:
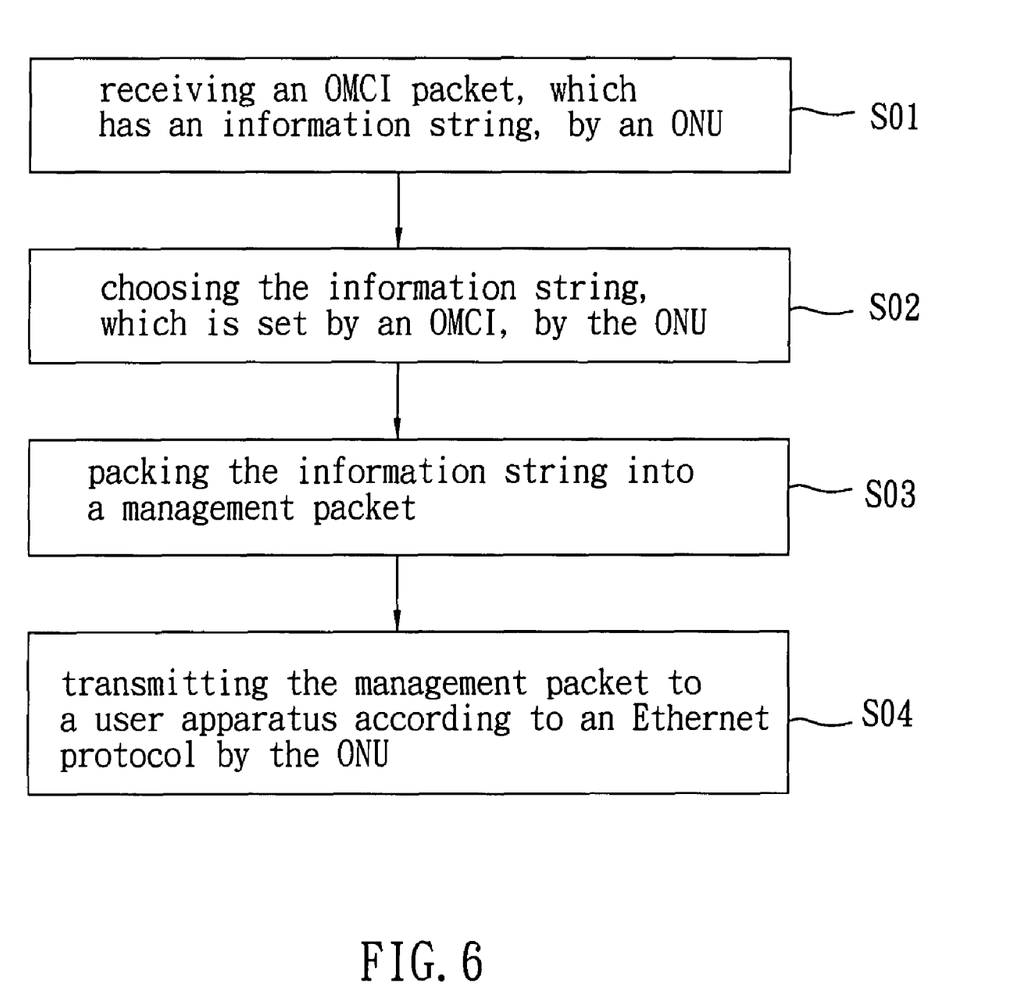
FIG. 6 is a flow chart showing a management method of the optical fiber network system according to another preferred embodiment of the invention.

As shown in FIG. 6, a management method of the optical fiber network system according to another preferred embodiment of the invention is applied to the optical fiber network system 2 of the above-mentioned embodiment. The management method includes steps S01 to S04. In step S01, the ONU 22 receives the OMCI packet OP1 including the information string. In step S02, the ONU 22 adopts the information string, which is set by the OMCI and provides the information of the management functions of configuration management, failure management, performance management and safety management set by the OMCI. In step S03, the information string is packed into the management packet MP1. In this embodiment, the information string is packed into the OAMPDU packet. In step S04, the ONU 22 transmits the management packet MP1 to the user apparatus 21 according to the Ethernet protocol.

Figure 7:
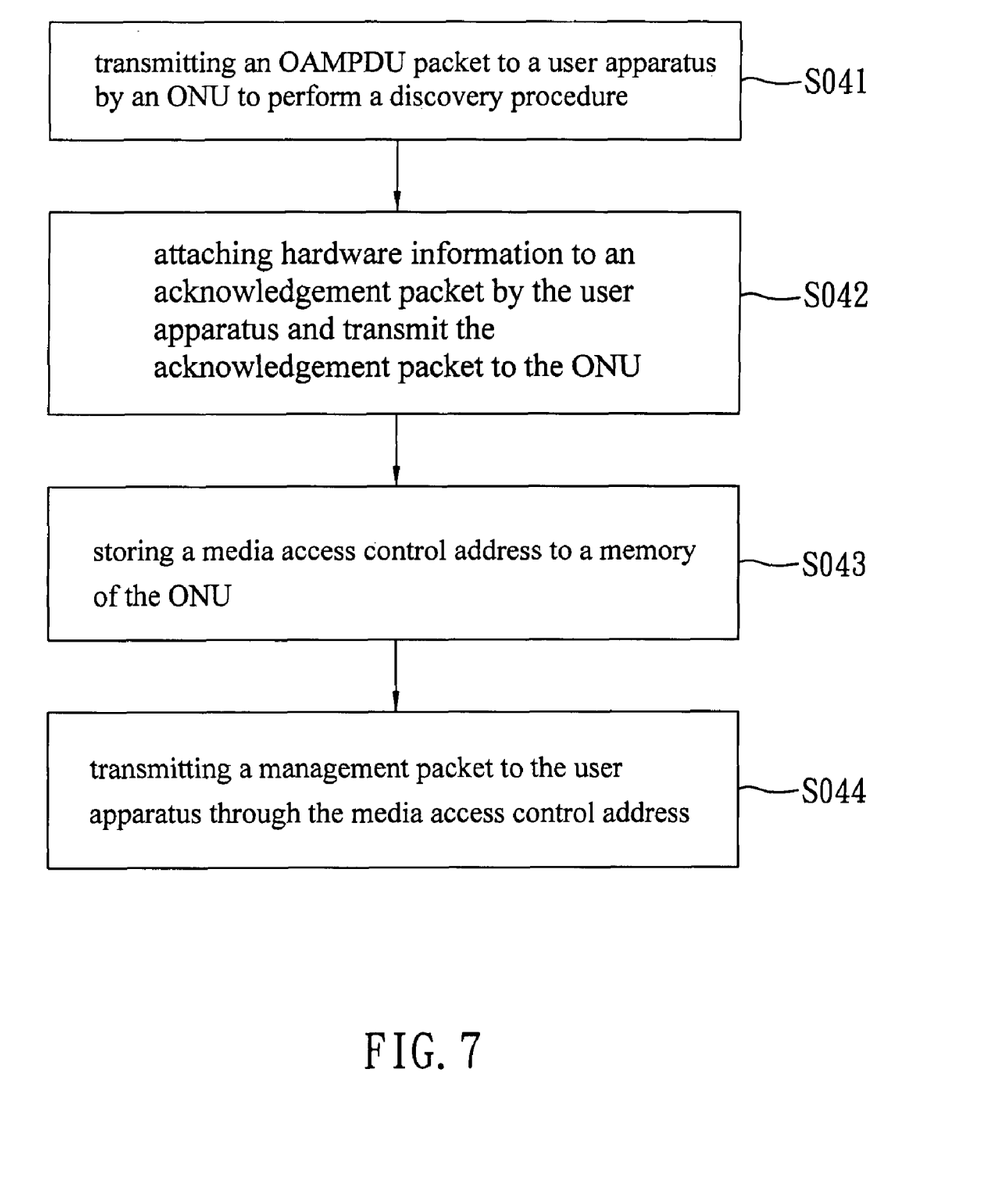
FIG. 7 is another flow chart showing the management method of the optical fiber network system according to another preferred embodiment of the invention.

Herein, the Ethernet protocol is described by taking IEEE 802.3ah as an example, and the information of the user apparatus 21 is obtained according to the discovery procedure defined by IEEE 802.3ah through the following steps S041 to S044 (see FIG. 7). In step S041, the ONU 22 transmits the OAMPDU packet to the user apparatus 21 to perform the discovery procedure. In step S042, the user apparatus 21 attaches the hardware information to the acknowledgement packet, and transmits the acknowledgement packet to the ONU 22, wherein the hardware information may be the media access control address of the user apparatus 21, for example. In step S043, the media access control address is stored in the memory 222 of the ONU 22. In step S044, the management packet MP1 is transmitted to the user apparatus 21 through the media access control address.

Since the management method of the optical fiber network system according to this embodiment has been described in the optical fiber network system 2 of the above-mentioned embodiment, detailed descriptions thereof will be omitted.

In summary, the Ethernet is established between the optical network unit and the user apparatus, the management functions set by the OMCI are packed into the management packet, and the management packet is transmitted to the user apparatus for the network management according to the Ethernet protocol in the optical fiber network system and its management method according to the invention. Compared with the related art, the invention can continue using the network management functions, which is set by the OMCI, between the optical network unit and the user apparatus, but does not adopts other network management protocols for the network management. Thus, the overall network management efficiency can be enhanced.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A management method of an optical fiber network system, the optical fiber network system comprising at least one user apparatus and an optical network unit (ONU), the ONU being connected with the user apparatus, the management method comprising steps of:
   adopting at least one information string, which is set by an ONU management and control interface (OMCI), by the optical network unit;
   packing the information string into a data field of a management packet by the optical network unit;
   adding an OMCI ending code to the data field, wherein the OMCI ending code is disposed adjacent to the information string;
   identifying an ending bit of the information string by the OMCI ending code; and
   transmitting the management packet to the user apparatus by the optical network unit according to an Ethernet protocol.

2. The method according to claim 1, further comprising a step of:
   transmitting the management packet through a media access control address.

3. The method according to claim 1, wherein the Ethernet protocol is IEEE 802.3ah.

4. The method according to claim 3, wherein the management packet is an OAMPDU packet.

5. The method according to claim 4, further comprising steps of:
   transmitting the OAMPDU packet to perform a discovery procedure; and
   transmitting hardware information to the optical network unit through an acknowledgement packet by the user apparatus.

6. The method according to claim 5, further comprising a step of:
   storing the hardware information in a memory of the optical network unit.

7. The method according to claim 1, further comprising a step of:
   receiving an OMCI packet, which comprises the information string, by the optical network unit.

8. A management method of an optical fiber network system, the optical fiber network system comprising at least one user apparatus and an optical network unit (ONU), the ONU being connected with the user apparatus, the management method comprising steps of:
   receiving an OMCI packet, which comprises the information string, by the optical network unit, wherein the information string has a header, a handle association identifier, a data type, a device identifier, a data identifier, a data content;
   adopting at least one information string, which is set by an ONU management and control interface (OMCI), by the optical network unit;
   packing the information string into a data field of a management packet by the optical network unit;
   adding an OMCI ending code to the data field, wherein the OMCI ending code is disposed adjacent to the data content of the information string;
   identifying an ending bit of the information string by the OMCI ending code;
   transmitting an OAMPDU packet the user apparatus to perform a discovery procedure by the optical network unit according to an Ethernet protocol;
   transmitting hardware information to the optical network unit through an acknowledgement packet by the user apparatus;
   storing a media access control address in a memory of the optical network unit; and
   transmitting the management packet through the media access control address.

9. An optical network unit, comprising:
   a receiving module for receiving an ONU management and control interface (OMCI) packet transmitted from an optical line terminal;
   a converting module electrically connected to the receiving module for adopting at least one information string from the OMCI packet, and packs the information string into a data field of a management packet, wherein the information string has a header, a handle association identifier, a data type, a device identifier, a data identifier, a data content, an OMCI ending code is disposed adjacent to the data content of the information string and an ending bit of the information string is identified by the OMCI ending code; and
   a transmitting module electrically connected to the converting module for transmitting the management packet to a user apparatus.

* * * * *